United States Patent [19]
Caputo

[11] 4,409,490
[45] Oct. 11, 1983

[54] HYDRAULIC PLANT
[75] Inventor: Carmelo Caputo, Rome, Italy
[73] Assignee: Solar 77 S.p.A., Rome, Italy
[21] Appl. No.: 288,766
[22] Filed: Jul. 31, 1981
[30] Foreign Application Priority Data
   Aug. 5, 1980 [IT] Italy ................................ 24002 A/80
[51] Int. Cl.³ .................................................. F03B 13/00
[52] U.S. Cl. .................................... 290/4 D; 290/54; 60/414
[58] Field of Search ................. 290/4 R, 4 D, 43, 54; 60/413–415; 417/411, 426

[56] References Cited
   U.S. PATENT DOCUMENTS

4,246,978  1/1981  Schulz et al. ................... 60/414 X
   4,317,048  2/1982  Kime ............................... 290/54 X
   4,368,391  1/1983  Hellouin de Menibus ........ 290/4 D

FOREIGN PATENT DOCUMENTS

2408775  7/1979  France .............................. 60/414

Primary Examiner—J. V. Truhe
Assistant Examiner—W. E. Duncanson, Jr.
Attorney, Agent, or Firm—Karl F. Ross

[57] ABSTRACT

The plant described resolves the problem of recovering the energy generated by heat engines under test, acceptance trials or experimental tests by the generation of alternating electrical current for which the alternator is always connected to the supply network even in the absence of mechanical energy produced by said engines under test, there being provided hydraulic pumping dynamometric units which act upon said generator through an accumulation and regulation unit which provides for smoothing out the liquid delivery rate by the action of a differential piston group adapted for exposing and closing discharge or supply apertures for the hydraulic circuit in response to the variations of power which take place during the test or acceptance cycles of said heat engines and which manifest themselves in variations in output rate of said dynamometric pumping units.

12 Claims, 3 Drawing Figures

HYDRAULIC PLANT

BACKGROUND OF THE INVENTION

The present invention relates to a plant for the dynamometric braking of heat engines under test, acceptance test or experimental test or the like and the simultaneous recovery of energy produced by such engines, by conversion of such energy into alternating electrical current, by means of an accumulation and regulation unit which provides for regulating the circulating flow while maintaining the alternator always on the grid under whatever circumstances, even in the absence of energy produced by the heat engines under test.

It is known that the firms which construct heat engines of small and medium capacity, for example from 20 to 300 kW, keep permanently running a certain number of engines for effecting running-in and acceptance or for experimental runs of long duration.

Although engines of different outputs and having different operational sequences are adjacent to one another on test beds, the total power used in said tests is frequently considerable, even amounting to some hundreds of kW, and it is generally lost in the usual dynamometric brakes or is used in part in the form of heat with a limited possibility of utilization at low efficiency.

The recovery of the mechanical power produced by the engines under test, in the form of electrical energy, which is the most desirable form, has proved to be difficult on account of the discontinuity of energy production by the engines under test due both to the rotational speed and torque of each engine and to the number of engines simultaneously in operation, with the result that it proves impossible to achieve a recovery in the form of practically useful electrical energy. In fact dynamometric brakes with wound rotor, either for direct current or for alternating current are used, but they present respectively notable problems of control of the voltage or of parallel coupling, which hinder their use. Also proposed have been circuits of the hydraulic type employing dynamometric brakes with hydraulic pumps associated with hydraulic motors or turbines for connection to an alternator, but such plants also have proved to be very costly and of limited use, in that it is necessary to make use of pumps having a very flat characteristic accompanied by loss of efficiency and the necessity of using enormous delivery rates of water involving prohibitive costs and bulk.

SUMMARY OF THE INVENTION

The objective of the present invention is that of permitting the recovery of the power produced by engines under test, acceptance test or the like in the form of alternating electrical current energy while maintaining the connection of the alternator to the external electricity network even when the energy produced is highly variable or temporarily completely absent.

This objective is achieved according to the present invention by means of a hydraulic plant for the dynamometric braking and the recovery of the energy produced by heat engines under test, acceptance or experimental test or the like, characterised in that it comprises a plurality of dynamometric pumping units connected mechanically to the engines under test; which units produce fluid at a constant pressure at a variable output rate in relation to the power applied, said fluid being supplied into an accumulation and regulation unit adapted both to operate as a lung to intervene in the variations of output of the hydraulic oil circuit and for maintaining constant and regulating respectively the pressure and delivery rate of the circuit, said units supplying at constant pressure a user unit comprising a hydraulic motor of constant pressure and constant rotational speed functioning at a variable load, said motor being connected mechanically to an alternating current generator which in turn is adapted to be incorporated in the normal external distribution grid, said generator being always connected to said external grid whether the power transmitted is greater than or less than that used or capable of being used or whether said power is temporarily zero, in the first two cases the supply being regulated by said accumulation and regulation unit while in the third case the generator fulfills the function of a synchronous motor so as to maintain in all cases the connection with the external grid and the internal circuit pressure, said regulation of the delivery rate being determined by a mobile equipment formed of three pistons slidable in as many cylinders, of which two being equipped with appropriate discharge and supply ports and the third being of differential type responding to predetermined equilibrium conditions, said three pistons forming a mobile equipment which, according to the output rate of the dynamometric pumping units, causes the ports of said regulation unit to open or close for supplying the user unit in order to discharge the excess and for the inverse function of the user unit. The pumping units as also the hydraulic motor for the recovery of energy are of the type having axial pistons and variable swept volume, which variation in delivery is due to a varied inclination of the plate or of the pump body, a variation which is provided according to this invention by linking with the power conditions resulting from the engines under test and their operating cycles. A linking of known type is also provided for the variation in load of the hydraulic motor of the user unit, in relation to the position adopted by the mobile equipment of the regulation column, said linkage being capable of being directly of the mechanical type or, for example, provided by electrical servo-control position sensors of the inclination of the plate of the hydraulic motor of the user. Furthermore, in the case of running in or acceptance test lines comprising many motors operating at an appreciable output, it is possible to centralize all the deliveries of the pumps of the motors under test and to employ an appropriate turbine, for example a pelton turbine connected to the alternator.

The invention provides a hydraulic plant for the dynamometric braking of and the recovery of energy from engines under test comprising a separate pumping unit mechanically connected to and driven by each engine under test and operable to pump fluid at a substantially constant pressure and at a delivery rate which is a function of the power supplied by the associated engine, a hydraulic circuit having a high pressure side to which the pumped fluid is delivered and a lower pressure side for the delivery of fluid to the pumping units, a fluid reservoir connected to said low pressure side of the hydraulic circuit, means for maintaining said reservoir at a substantially low predetermined pressure, a hydraulic motor operable at substantially constant pressure and variable liquid flow rate, an alternating electrical current generator mechanically connected to said hydraulic motor and operable to be driven by said motor and to drive said motor, said generator being adapted for connection to external electrical network, a first fluid connection from said motor to said reservoir, a second fluid connection to said motor, valve control means connected between said high pressure side of said hydraulic circuit, said reservoir and said second fluid connection and displaceable as a function of the fluid delivery rate in said high pressure side and the fluid delivery rate in said second fluid connection demanded by said hydraulic motor to control the delivery of fluid from said high pressure side to said reservoir and to said second fluid connection, said valve control means being operable to at least partly place said high pressure side in communication with said reservoir when the fluid delivery rate in said high pressure side is greater than the delivery rate demanded in said second fluid connection and to at least partly interrupt delivery of fluid from said high pressure side to said second conduit when the fluid delivery rate in said high pressure side is less than the delivery rate demanded in said second fluid connection and a non-return valve connection between said second fluid connection and said reservoir to supply fluid to said motor when the fluid delivery rate in said high pressure side falls to zero and the motor is driven as a pump by the alternator from the external electrical network.

One embodiment of the invention will now be described by way of example, reference being made to the accompanying drawings.

Figures 1, 3:
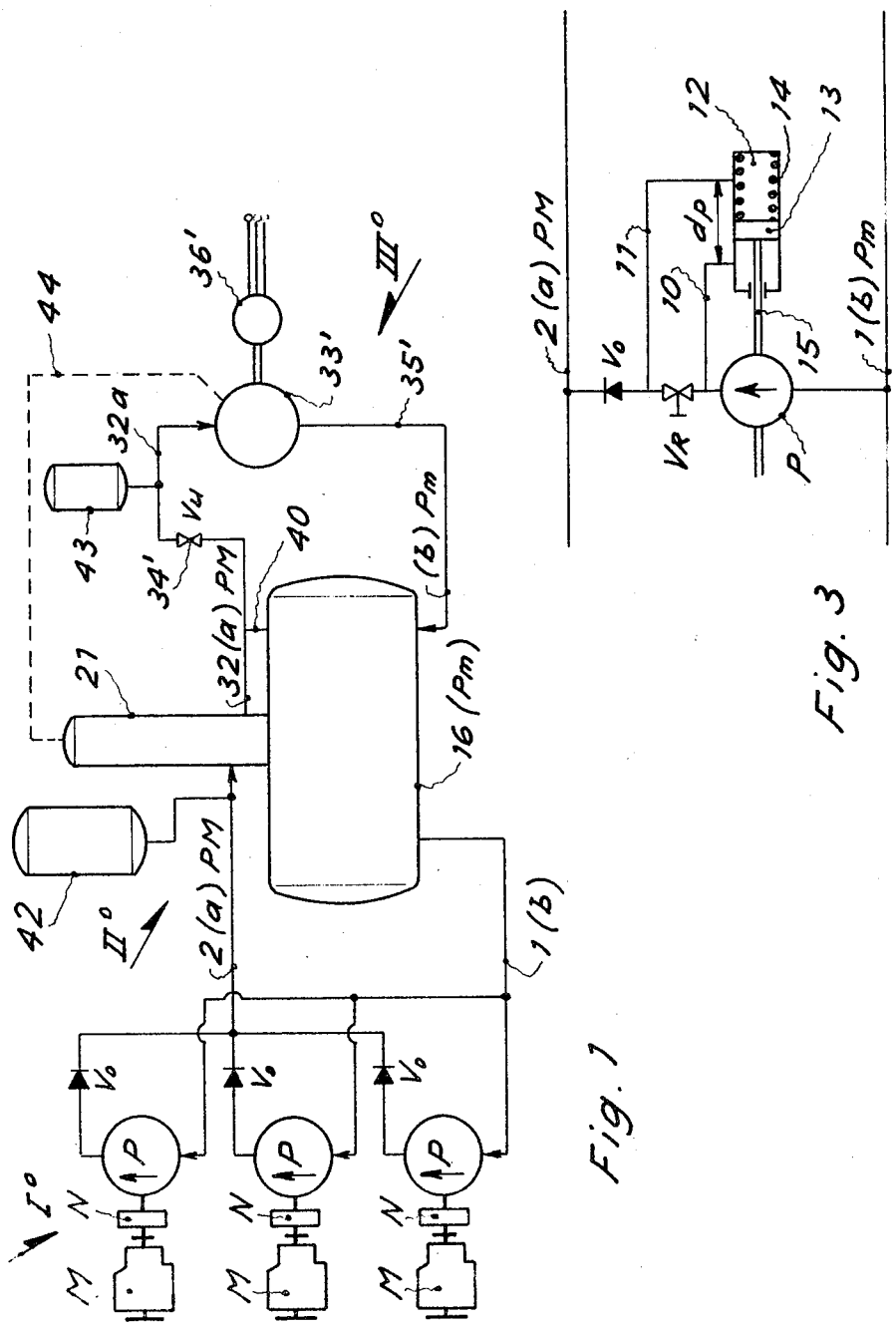
FIG. 1 illustrates diagrammatically the general layout of a plant according to the invention.
FIG. 3 illustrates a detail of the control of the output of hydraulic pumping units.

The plant illustrated in FIG. 1 comprises a plurality of pumping dynamometric units indicated generally at I° each connected in known manner to a separate heat engine M under test, e.g., acceptance test or the like. Any appropriate number of pumping units may be associated with each engine and the engines may have different powers and operating characteristics and be operating under differing functional regimes according to the test or acceptance programmes they are undergoing and which need not in any way be associated with individual or collective standardized forms.

Each of said pumping units should be appropriate to the output of the engine which it is to serve and should be suitable for providing to the engine the desired load, for measuring the parameters of the mechanical power generated by the engine under test and for converting said power apart from losses due to the hydraulic oil circuit, by drawing a fluid from a common low-pressure main 1(b) and supplying it to a common high-pressure main 2(a) through a non return valve Vo. Reference II° denotes an accumulation and regulation unit for maintaining substantially constant the respective pressures in the main 1(b) and the main 2(a), as will be explained below. Reference III° denotes the user unit, suitable for producing useful electrical energy in known manner, the hydraulic pressure drop between the two mains or branches of the hydraulic oil circuit originating from said accumulation and regulation unit II°.

The dynamometric units I° are composed of a separate hydraulic pumping unit P connected each to an engine M by means of a dynamometric element N adapted to measure the power generated by the engine M and if necessary to reduce the rotational speed of the pump drive shaft.

According to the invention it is provided that the hydraulic circuit shall have a maximum pressure and minimum pressure of constant values, while the variation in regard to the power generated by the various engines under test shall be accommodated by the delivery rate of each pumping unit P.

Each pumping unit P is preferably composed of one or more piston and cylinder pumping assemblies controlled and driven by a swash plate the inclination of which is adjustable to control the stroke of such pumping assemblies and hence the volume swept by the pistons. This enables fluid to be pumped at a constant pressure and power to be absorbed in proportion to that generated by the associated engine. As will be understood, a number of piston and cylinder pumping assemblies may be controlled by a single swash plate, the piston rods of such assemblies being disposed about the axis of rotation of the swash plate.

In view of the possible diversity of power of the engines M to be tested, it is provided for each dynamometric pumping unit that it shall be possible to regulate the delivery rate of the pump in order to adapt it to the power generated by the engine itself in such a manner that the delivery rate remains proportional also to the variation in the speed of revolution of the engine.

With reference to FIG. 3, there is illustrated diagrammatically a device for the automatic control of the inclination of the swash plate, and therefore of the output or delivery rate of the associated pump unit. This device comprises the non-return valve Vo, disposed in the delivery pipe of the pump unit P and a manually operable regulating valve $V_R$, by means of which it is possible to determine the load which the dynamometric brake can absorb. The valve $V_R$ produces a localized loss in the flow from the pump unit with a consequent pressure difference "dp" between the upstream and downstream sides of the valve itself. Such pressure difference is transmitted by means of the pipe 10 upstream of the valve $V_R$ and the pipe 11 downstream of the valve $V_R$ across a piston 13 slidable in a cylinder 12 against the effect of a spring 14. The piston 13 is connected by a piston rod 15 to the swash plate of the pump unit P in such a manner as to control the inclination of the swash plate. In this way, if the rotational speed of the engine under test increases, the delivery upstream of the valve $V_R$ will be greater and the pressure drop "dp" between upstream and downstream sides of the valve $V_R$ will also be greater. The piston 13 will consequently be displaced against the action of the spring 14 and said displacement will produce an increased inclination in the body or disc of the pump P, correspondingly increasing the delivery rate.

Figure 2:
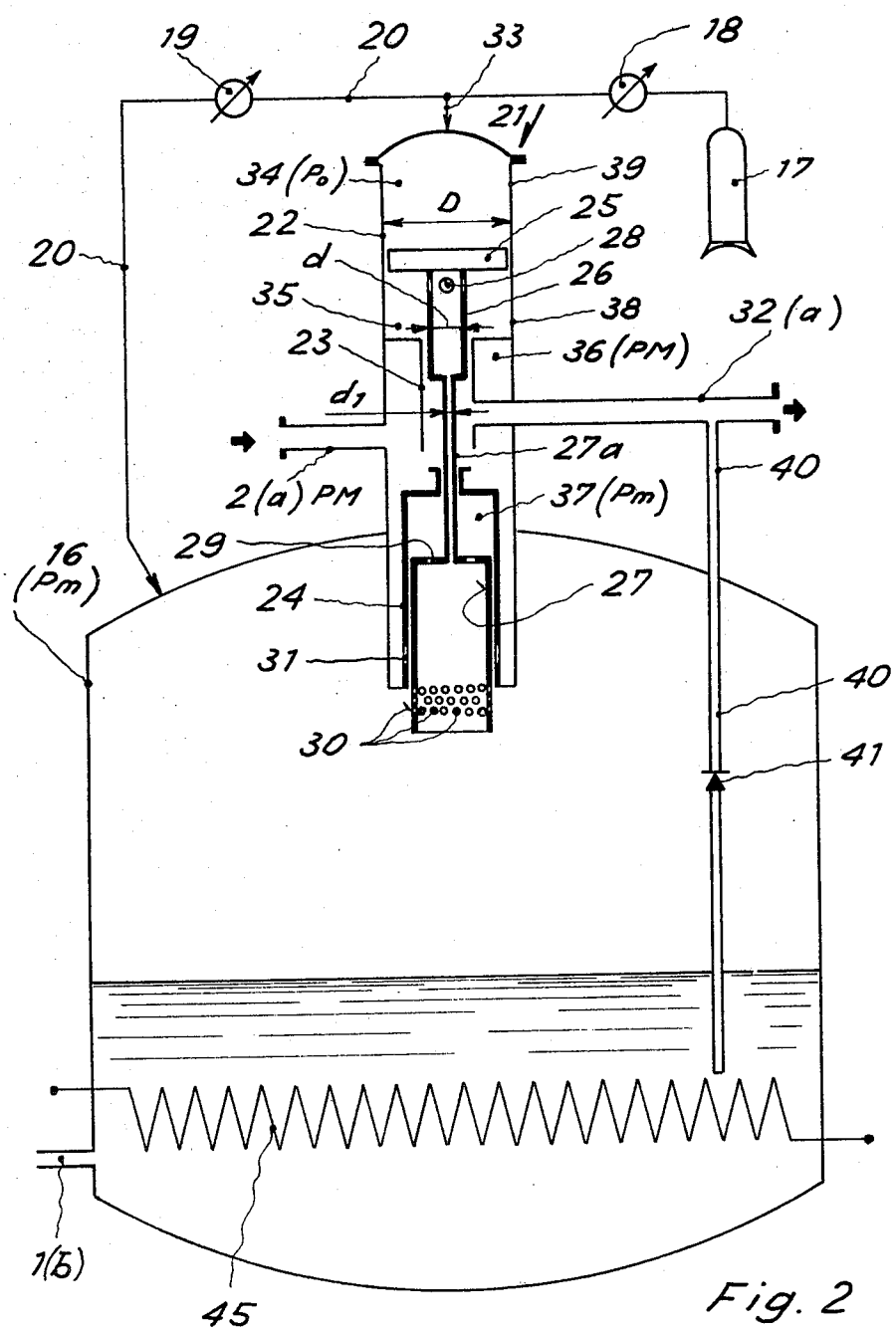
FIG. 2 illustrates in diagrammatic form the accumulation and regulation group indicated by II° in FIG. 1.

The outputs of the pumping units P are collected in the high-pressure main 2(a) of a hydraulic circuit and supplied to the accumulation and regulation unit II° illustrated in greater detail in FIG. 2. With reference to FIG. 2, a reservoir 16 is connected to the low-pressure main 1(b) which supplies fluid to the various pump units P. The low-pressure main 1(b) is maintained at a desired predetermined value by means of a pressurized gas contained in a bottle 17 and by means of reducers 18–19 incorporated in a pipe 20 which leads to the reservoir 16. Above the reservoir 16 there is disposed a valve control device 21 which comprises three fixed coaxial cylinders, of which one is an upper cylinder 22, one an intermediate cylinder 23 and one a lower cylinder 24, in which there slide associated pistons all connected rigidly to one another in such a manner as to form a single mobile unit. This unit comprises a piston 25 slidable in the cylinder 22 and having a diameter "D" (or it could be an equivalent bellows), a piston 26 slidable in the cylinder 23 and having a diameter "d" and a piston 27 slidable in the cylinder 24. As can be seen from FIG. 2, the piston 26 is hollow, it is integral with the piston 25 and possesses, in its upper end, apertures 28, while at its lower end it is integral with the piston 27 by means of a shaft 27a of diameter $d_1$, drilled longitudinally in such a manner as to provide communication between the interior of the piston 26 and the interior of the piston 27. In its turn the piston 27, which slides in the cylinder 24, possesses upper apertures 29 and lower apertures 30 and is open at the bottom towards the reservoir 16, while the cylinder 24 possesses in its lower part apertures 31. The cylinder 22 is closed at its upper end and is extended at its lower end to form a chamber 35 in which the cylinders 23 and 24 are coaxially disposed. The chamber 35 communicates with the high pressure main 2(a) and with the interior of the second cylinder 23. A fluid connecting pipe 32(a) opens to the interior of the cylinder 23 and such opening is controlled by the piston 26, the pipe 32(a) supplying fluid to the user unit III° as will be described below. The upper end of the cylinder 22 is in communication with the pipe 20 by means of a connection 33 opening to the pipe 20 between the reducers 18 and 19. As a consequence of the arrangement of cylinders and pistons of the valve control device 21, the following four chambers are formed:

Chamber 34—between the top end of the cylinder 22 and the upper surface of the piston 25 of diameter D, in which chamber there acts the gas (air or inert gas) coming from the bottle 17 at a predetermined pressure regulated by the reducer 18. The pressure existing in the chamber 34 will be denoted by the value Po, (the chamber 34 may alternatively be composed of a bellows).

Chamber 35—is defined by the base of the upper cylinder 22, by the lower surface of the piston 25 and by the external surface of the piston 26 of diameter d. In this chamber there obtains the pressure which exists inside the reservoir 16 and which will be denoted by $P_m$, that is the lesser pressure given by the pressure in the bottle 17 after the two reducers 18–19, supplied to the tank 16 through the pipe 20. As can be seen from FIG. 2, the pressure $P_m$ existing in the reservoir 16 is transmitted from the interior of the piston 27, through the hollow shaft 27a, through the inside of the piston 26 and through the ports 28 into said chamber 35.

Chamber 36—formed of the intermediate part of the column 21, the cylinder 23 and the exterior of the cylinder 24. Into this chamber there leads the delivery main 2(a) from the hydraulic pumps P, through which there exists in the chamber 36 liquid at the maximum pressure PM, which liquid can pass into the supply pipe 32(a) to the user unit, departing from said cylinder 23, if the piston 26 is in the raised position.

Chamber 37—formed of the interior of the cylinder 24 as far as the upper surface of the piston 27. In this chamber there obtains the pressure $P_m$ existing inside the reservoir 16 in that it is in communication with same through the upper ports 29 of the piston 27. The lower ports 30 are of graduated aperture and, for example, formed as a series of small holes.

As can be seen from the arrangement, although diagrammatic, of the various parts of the column 21, two limiting situations can be distinguished depending upon whether the mobile unit formed of the three pistons 25, 26 and 27 is situated in the completely lowered position or in the position raised to the maximum permitted limit.

In the low position with the piston 25 at the level indicated by 38, the ports 31 of the cylinder 24 are closed by the piston 27 while the ports 28 of the piston 26 are closed by the wall of the cylinder 23 and access to the pipe 32(a) for supplying the user unit is closed by piston 26.

In the opposite position, with the equipment raised to the limit, with the piston 25 at the level indicated by 39, the lower ports 30 of the piston 27 become situated step by step in correspondence with the ports 31 of the cylinder 24, with the result that liquid at the maximum pressure PM existing in the chamber 36 can pass into the interior of the vessel 16. All the ports are therefore open.

With regard to the user unit III° we may once again refer to FIG. 1 in which it will be noted that from the column 21 the pipe 32(a) at the high pressure PM supplies the fluid to a hydraulic motor 33' through a cut-off valve 34' which fluid returns from the motor 33' to the tank 16 at the low pressure Pm through a duct 35'.

The hydraulic motor 33' is mechanically connected to an alternator 36', by which electrical energy for despatch to the grid is produced.

Along the delivery route from the pump units P to the motor 33' there are provided regulating tanks composed of bottles 42,43 with a gas dome which bottles accumulate the excess delivery from the fluid pumped by the pump units P to restore it at the times of lesser production until the stock is exhausted.

The hydraulic motor 33' is preferably of the axial pistons type, controlled by a swash plate whereby the pressure and number of revolutions remain constant while it is possible to vary the swept volume and therefore the delivery in relation to that produced by the pumping units. Provision is made for the swash plate of the motor 33' to be regulated in inclination by means of a linking connected in known manner to the position of the mobile unit of the column 21, such linking whether mechanical or electrical, being indicated merely diagrammatically by the broken line 44. Moreover, the motor 33' can also function as a hydraulic pump, being effectively a piston and cylinder pumping assembly, when the alternator 36' becomes a motor due to lack of energy upstream, and a connection 40 is provided between the delivery pipe 32(a) and the tank 16, this connection being equipped with a non-return valve 41 (FIG. 2) in such a manner that the motor 33', when it has become a pump, can take liquid from the tank 16 through the pipe 40 and despatch it again into the same tank 16 via the conduit 35' keeping the minimum pressure Pm inside same constant for supplying the dynamometric units I°.

The reservoir 16 is also equipped with a cooling circuit 45, into which there can be introduced a heat-removing fluid in the case of an accumulation of excess energy produced in such a quantity that it cannot be disposed of by the user unit III°.

With reference to the valve control device 21 of the regulating unit and to the mobile unit contained in same, it is provided that the effective diameters of the various pistons and the pressures existing in the aforementioned chambers shall bring about an equilibrium condition given by the equality between the pressure difference acting upon the two sides of the piston 25 (Po−Pm) multiplied by the area of same (neglecting the thickness of the piston 26) and the pressure difference acting upon the two sides of the piston 26 (PM−Pm) multiplied by the effective area of same, that is to say (Po−Pm) $D^2 = (PM-Pm)(d^2-d_1^2)$, according to which, the value of Po being fixed, the mobile unit moves in accordance with the values of the fluid delivery arriving in the chamber 36 at the maximum pressure PM. Furthermore, the axial movement of the entire mobile unit does not produce any effect during the period in which the ports 30 of the piston 27 remain closed (upper limit) and the mouth of the pipe 32(a) remains open (lower limit), said interval being termed the "regulating interval."

When the mobile unit moves into a position above said interval, the ports 30 commence to open causing the excess delivery coming from the pump P to discharge and vice-versa, when the mobile unit descends beyond said interval, the opening of the pipe 32(a) is reduced until it is closed due to lack of delivery from the pumps.

For an improved understanding of the function of the plant, we may consider two operating situations with continuous running and two transient situations with excess or deficiency of delivery with respect to that which is acceptable by the user unit.

(a) In a continuous operation situation with recovery of energy from the motors M, in which the delivery produced by the dynamometric units entering the chamber 36 of the collector 2(a) is equal to that discharging through the pipe 32(a) and absorbed by the user unit III°, the mobile unit can oscillate or move from the uppermost position to the lower limit of the regulating interval, so that the ports 30 are closed and the pipe 32(a) is completely open;

(b) In a continuous operation situation in the absence of energy absorption, the pipe 32(a) behaves as if it were closed, so that the mobile unit is thrust upwards beyond the limit of the regulating interval, completely exposing the ports 30 of the piston 27. The delivery coming from the collector 2(a) passes through said ports 30 and 31 and discharges into the reservoir 16, maintaining the upstream pressure PM constant. The cooling circuit 45 can remove by thermal means all the power dissipated;

(c) In a transient condition in which the delivery of liquid coming from the pumps is greater than that accepted by the user unit III° the mobile unit tends to be raised until a portion of the ports 30 is exposed to the ports 31 permitting a gradual and proportional passage of the fluid excess which is discharged into the reservoir 16, maintaining constant the pressure and delivery of the supply to the user unit;

(d) In a transient situation in which the delivery from the pumping units P is less than that required by the user unit, the mobile unit descends until the ports of the supply duct 32(a) are partly obstructed, causing the delivery to be proportionally reduced. In the case where the production of fluid under pressure by the hydraulic pumps P is temporarily stopped, the pipe 32(a) is completely obstructed and then the electrical generator 36', while maintaining synchronism with the frequency of the network to which it remains connected, adopts for a short period the function of a motor device, while the hydraulic motor 33' becomes a pump, supplied from the reservoir 16 via the connection 40 and the non-return valve 41, while the output of the unit 33' enters the reservoir 16 maintaining the minimum supply pressure to the circuit.

The invention provides that in every situation of continuous or transient operation it is not necessary to intervene in any way in the plant itself, because it is automatically regulated, passing from the maximum production limit of energy recovery, with possible disposal of the excess delivery, to the opposite limit of energy absorption from the external grid, in order to maintain the coupling frequency and the minimum pressure in the circuit, the electrical generator functioning in this case as a motor without any intervention being necessary until the restoration of energy generating conditions by the heat engines under test, acceptance test, experiments or the like.

It will be understood that numerous variants can be applied to what has been described above, in particular in regard to the use of units of known type, which are commercially available, the characteristics of which can be acceptable within even very wide limits, provided that the conditions provided for by the invention are realised, without thereby departing from the protective cover of the invention itself. It is also possible, for plants of appreciable output, to provide for centralization of the deliveries and to use an appropriate turbine of the pelton type connected to the alternator.

I claim:

1. Hydraulic plant for the dynamometric braking of and the recovery of energy from engines under test comprising a separate pumping unit mechanically connected to and driven by each engine under test and operable to pump fluid at a substantially constant pressure and at a delivery rate which is a function of the power supplied by the associated engine, a hydraulic circuit having a high pressure side to which the pumped fluid is delivered and a lower pressure side for the delivery of fluid to the pumping units, a fluid reservoir connected to said low pressure side of the hydraulic circuit, means for maintaining said reservoir at a substantially low predetermined pressure, a hydraulic motor operable at substantially constant pressure and variable liquid flow rate, an alternating electrical current generator mechanically connected to said hydraulic motor and operable to be driven by said motor and to drive said motor, said generator being adapted for connection to external electrical network, a first fluid connection from said motor to said reservoir, a second fluid connection to said motor, valve control means connected between said high pressure side of said hydraulic circuit, said reservoir and said second fluid connection and displaceable as a function of the fluid delivery rate in said high pressure side and the fluid delivery rate in said second fluid connection demanded by said hydraulic motor to control the delivery of fluid from said high pressure side to said reservoir and to said second fluid connection, said valve control means being operable to at least partly place said high pressure side in communication with said reservoir when the fluid delivery rate in said high pressure side is greater than the delivery rate demanded in said second fluid connection and to at least partly interrupt delivery of fluid from said high pressure side to said second conduit when the fluid delivery rate in said high pressure side is less than the delivery rate demanded in said second fluid connection and a non-return valve connection between said second fluid connection and said reservoir to supply fluid to said motor when the fluid delivery rate in said high pressure side falls to zero and the motor is driven as a pump by the alternator from the external electrical network.

2. Hydraulic plant according to claim 1 in which the valve control means comprises first, second and third pistons respectively slidable in first, second and third cylinders, the pistons being connected for simultaneous displacement, the first piston being exposed on one side to a predetermined pressure, the second piston controlling communication between the reservoir and the other side of the first piston and controlling communication between said high pressure side and said second fluid connection and said third piston controlling communication between said high pressure side and said reservoir.

3. Hydraulic plant according to claim 2 in which said first cylinder is extended to form a chamber in which said second and third cylinders are coaxially disposed, said chamber being in communication with said high pressure side and with said second cylinder, said second fluid connection opens to said second cylinder under the control of said second piston, said third piston is hollow and open to said reservoir and is formed in its wall with apertures capable of being brought into register with apertures in the wall of said third cylinder to place the interior of said third piston in communication with said chamber.

4. Hydraulic plant according to claim 1 in which each pump unit comprises one or more piston and cylinder pumping assemblies and a swash plate operable to drive the pumping assemblies and the inclination of which is variable to control the stroke of the piston and cylinder pumping assemblies.

5. Hydraulic plant according to claim 4 including a regulating valve on the delivery side of each pumping unit and a piston and cylinder control device connected across said regulating valve and responsive to the pressure drop across said regulating valve to control the inclination of the associated swash plate.

6. Hydraulic plant according to claim 1 in which said hydraulic motor comprises a piston and cylinder pumping assembly and a swash plate operable to drive or be driven by the pumping assembly and having an inclination which is variable.

7. Hydraulic plant for dynamometric braking and the recovery of the energy produced by heat engines under test, acceptance test, experimentation or the like, characterised in that it comprises a plurality of dynamometric pumping units connected mechanically to the engines under test, which units produce fluid at constant pressure at variable delivery rate in relation to the power applied, said fluid being fed into an accumulating and regulating unit adapted both to operate as a lung for intervening in variations of delivery of the hydraulic oil circuit and for maintaining constant and regulating respectively the pressure and the delivery rate of the circuit, said unit supplying at constant pressure a user unit comprising a hydraulic motor of constant pressure and rotation speed operating at a variable flow rate, said motor being mechanically connected to an alternating electrical current generator which in turn is adapted to be connected into the normal external distribution network, said generator being always connected to said external network whether the power transmitted is greater or less than that utilized or utilizable or whether said power is temporarily zero, in the first two cases the supply being regulated by said accumulating and regulating unit while in the third case the generator adopts the function of a synchronous motor so as to maintain in every case the connection with the external supply network and the internal pressure of the circuit, said regulating of the delivery rate being determined by a mobile unit formed of three pistons slidable in as many cylinders, two of them being equipped with appropriate discharge and supply ports and the third being of differential type responding to predetermined equilibrium conditions, said three pistons forming a mobile unit which, in relation to the delivery of the dynamometric pumping units, provides for opening or closing the ports of said regulating unit for the supply to the user unit, for the discharge of the excess or for the inverse function of the user unit.

8. Plant as in claim 7 characterized in that said dynamometric pumping units are constituted of a pump of the axial pistons type having a variable delivery, the variation in delivery of which is controlled by the sudden pressure jump of the flow in a regulating valve, said pressure jump acting upon a cylinder-piston group having an opposed spring connected directly to the oscillating disc or body of the pump.

9. Plant as in claim 7 characterised in that said accumulating and regulating unit provides, for the accumulation of the circulating fluid, a reservoir in which the minimum pressure is maintained constant by compressed air or gas and, for the regulating of the supply flow, the action upon said differential piston being determined on one side by the minimum pressure existing in said reservoir and on the other side by an intermediate pressure controllable in accordance with the desired equilibrium conditions, said differential action being varied in one direction or the other by the delivery rate of the liquid pumped acting with its volume in the sense of tending to increase or decrease, consequently displacing said mobile equipment to open discharge ports or close supply ducts respectively.

10. Plant according to claim 7 characterised in that said user unit comprises a hydraulic motor of the axial pistons type at constant pressure and variable flow rate associated with an alternating current generator, both being capable of functioning as a pump and a motor in case of interruption to the production of power by the heat engines under test.

11. Plant as in claim 7 characterised in that the regulating of the flow absorbed by said hydraulic motor of the user unit is effected by linking to the position adopted by said mobile unit of the accumulating and regulating unit in response to the delivery emitted by said pumping units.

12. Plant as in claim 7 characterised in that gas-pressurized reservoirs are provided in the delivery circuit for absorbing sudden variations in delivery rate as the power applied varies.

* * * * *